(12) United States Patent
Nonaka et al.

(10) Patent No.: US 8,933,334 B2
(45) Date of Patent: Jan. 13, 2015

(54) FLAME RETARDANT, A FLAME-RETARDANT COMPOSITION, AN INSULATED WIRE, A WIRING HARNESS, AND A METHOD FOR MANUFACTURING THE FLAME-RETARDANT COMPOSITION

(75) Inventors: Tsuyoshi Nonaka, Yokkaichi (JP); Masato Inoue, Yokkaichi (JP); Tatsuya Shimada, Yokkaichi (JP); Yoshiharu Deguchi, Yokkaichi (JP); Yuuji Tanaka, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/312,609

(22) PCT Filed: Nov. 21, 2007

(86) PCT No.: PCT/JP2007/072525
§ 371 (c)(1),
(2), (4) Date: May 19, 2009

(87) PCT Pub. No.: WO2008/062820
PCT Pub. Date: May 29, 2008

(65) Prior Publication Data
US 2010/0025070 A1 Feb. 4, 2010

(30) Foreign Application Priority Data

Nov. 21, 2006 (JP) .................................. 2006-313819

(51) Int. Cl.
| | |
|---|---|
| H01B 3/30 | (2006.01) |
| C09K 21/02 | (2006.01) |
| H01B 3/44 | (2006.01) |
| H01B 7/295 | (2006.01) |
| C08K 3/22 | (2006.01) |
| C08K 9/08 | (2006.01) |

(52) U.S. Cl.
CPC ............... *C09K 21/02* (2013.01); *H01B 3/441* (2013.01); *H01B 7/295* (2013.01); *C08K 3/22* (2013.01); *C08K 9/08* (2013.01)
USPC .................................................... 174/121 A

(58) Field of Classification Search
USPC ............................. 174/110 R, 110 PM, 121 A
See application file for complete search history.

(56) References Cited

U.S. PATENT DOCUMENTS

| | | | |
|---|---|---|---|
| 4,124,562 A * | 11/1978 | Yui et al. ........................ 523/209 |
| 4,373,039 A | 2/1983 | Mueller et al. | |
| 5,139,875 A | 8/1992 | Metzemacher et al. | |
| 6,372,835 B1 | 4/2002 | Nosu et al. | |
| 6,500,882 B1 * | 12/2002 | Hiraishi et al. ................ 523/205 |
| 6,808,809 B2 * | 10/2004 | Herbiet et al. ................ 428/407 |

FOREIGN PATENT DOCUMENTS

| | | |
|---|---|---|
| EP | 0 292 233 A2 | 11/1988 |
| EP | 0 426 196 A1 | 5/1991 |
| JP | A-62-151464 | 7/1987 |
| JP | A-02-289421 | 11/1990 |
| JP | A-02-293316 | 12/1990 |
| JP | A-02-293317 | 12/1990 |
| JP | A-03-263440 | 11/1991 |
| JP | A-04-249550 | 9/1992 |
| JP | A-06-313069 | 11/1994 |
| JP | 02-736545 | 1/1998 |
| JP | A-2001-019966 | 1/2001 |
| JP | A-2002-226628 | 8/2002 |
| JP | B2-3339154 | 10/2002 |
| JP | A-2003-105252 | 4/2003 |
| JP | A-2005-330343 | 12/2005 |
| JP | A-2006-002117 | 1/2006 |

OTHER PUBLICATIONS

Office Action issued in German Patent Application No. 11 2007 002 791.6-43; Oct. 21, 2010; with English-language translation.
Oct. 16, 2012 Office Action issued in Japanese Patent Application No. 2008-545424 (with translation).
Chinese Office Action issued Nov. 7, 2012 for Chinese Patent Application No. 200780043196.0.
May 22, 2012 Office Action issued in Japanese Patent Application No. 2008-545424 (with translation).
Mar. 28, 2013 Office Action issued in Chinese Application No. 200780043196.0 (with English translation).
Sep. 3, 2013 Interrogation issued for Japanese Patent Application No. 2008-545424 (with translation).
Dec. 10, 2013 Office Action issued in German Patent Application No. 11 2007 002 791.6 (with translation).
Dec. 24, 2013 Office Action issued in Japanese Patent Application No. 2008-545424 (with translation).

(Continued)

*Primary Examiner* — Chau Nguyen
(74) *Attorney, Agent, or Firm* — Oliff PLC

(57) ABSTRACT

A flame retardant that is arranged to improve the cold resistance and the productivity of a composition, a flame-retardant composition, an insulated wire, a wiring harness, and a method for manufacturing the flame-retardant composition. The flame retardant includes a pulverized natural mineral which is mainly composed of magnesium hydroxide, wherein the pulverized natural mineral is surface-treated with an organic high polymer such as polyolefin. The amount of surface treatment is within a range of 0.1 to 10 mass %. The flame-retardant composition includes 30 to 250 parts by mass of the flame retardant with respect to 100 parts by mass of an organic high polymer such as polyolefin. The insulated wire includes a conductor and the flame-retardant composition which covers the conductor, and the wiring harness includes the insulated wire.

7 Claims, No Drawings

(56) References Cited

OTHER PUBLICATIONS

May 13, 2014 Decision of Refusal issued in Japanese Application No. 2008-545424 (Appeal No. 2013-000183) (with English Translation).

Jul. 11, 2014 Office Action issued in Chinese Application No. 200780043196.0 (with English Translation).

Nov. 13, 2014 Office Action issued in Chinese Application No. 200780043196.0 (including English Translation).

* cited by examiner

FLAME RETARDANT, A FLAME-RETARDANT COMPOSITION, AN INSULATED WIRE, A WIRING HARNESS, AND A METHOD FOR MANUFACTURING THE FLAME-RETARDANT COMPOSITION

TECHNICAL FIELD

The present invention relates to a flame retardant, a flame-retardant composition, an insulated wire, a wiring harness, and a method for manufacturing the flame-retardant composition.

BACKGROUND ART

Conventionally, various flame retardants are used in various fields to provide materials with flame retardancy. For example, a flame retardant is included in a covering material of an insulated wire for an automobile and an electric appliance.

From the view point of reducing loads on the global environment, a covering material of an insulated wire has recently been used which is prepared by adding magnesium hydroxide as a flame retardant to an olefin resin which does not emit harmful halogenous gas into the atmosphere when burned.

To such a flame-retardant composition, a large amount of magnesium hydroxide is added in order to provide sufficient flame retardancy. Because synthesized magnesium hydroxide which is synthesized using seawater for example is relatively expensive, reasonable natural magnesium hydroxide has recently been used in order to reduce the manufacturing cost.

For example, Japanese Patent No. 3339154 discloses a flame retardant prepared by pulverizing a natural mineral which is mainly composed of magnesium hydroxide and by providing surface treatment using fatty acid, fatty-acid metallic salt, a silane coupling agent, or a titanate coupling agent, a flame-retardant composition including this flame retardant, and an insulated wire coated with this flame-retardant composition.

DISCLOSURE OF THE INVENTION

Problems to be Solved by the Invention

A coating material of an insulated wire needs to have various characteristics including mechanical property, flame retardancy, and cold resistance. However, the cold resistance of a flame-retardant composition which is prepared by adding the conventional flame retardant, which is prepared by pulverizing a natural mineral which is mainly composed of magnesium hydroxide, to an olefin resin is not sufficient. In addition, in the process of preparing the flame-retardant composition, the discharge amount from a kneader is small, which results in low productivity of the composition.

An object of the present invention is to provide a flame retardant that is arranged to improve the cold resistance and the productivity of a composition, a flame-retardant composition, an insulated wire, a wiring harness, and a method for manufacturing the flame-retardant composition.

Means to Solve the Problem

To achieve the objects and in accordance with the purpose of the present invention, a flame retardant according to a preferred embodiment of the present invention includes a pulverized natural mineral which is mainly composed of magnesium hydroxide, wherein the pulverized natural mineral is surface-treated with an organic high polymer.

The amount of surface treatment using the organic high polymer is preferably within a range of 0.1 to 10 mass %.

The organic high polymer preferably includes one or a plurality of materials selected from the group consisting of polyolefin, a styrene type thermoplastic elastomer, and an olefin type thermoplastic elastomer.

The polyolefin may preferably be polypropylene and/or polyethylene, the styrene type thermoplastic elastomer may preferably be a styrene-ethylene-butylene-styrene block copolymer and/or a styrene-ethylene-propylene-styrene block copolymer, and the olefin type thermoplastic elastomer may preferably be metallocene polyethylene.

A flame-retardant composition according to a preferred embodiment of the present invention includes the flame retardant described above and an organic high polymer.

The organic high polymer of the flame retardant and the organic high polymer of the flame-retardant composition are preferably of the same kind.

The flame-retardant composition preferably includes 30 to 250 parts by mass of the flame retardant with respect to 100 parts by mass of the organic high polymer.

An insulated wire according to a preferred embodiment of the present invention includes a conductor and the flame-retardant composition described above which covers the conductor.

A wiring harness according to a preferred embodiment of the present invention includes the insulated wire described above.

A method for manufacturing the flame retardant composition according to a preferred embodiment of the present invention includes a step of kneading the flame retardant described above and an organic high polymer.

Effects of the Invention

The flame retardant according to the preferred embodiment of the present invention improves the cold resistance of the flame-retardant composition prepared by adding this flame retardant to the organic high polymer. This appears to be the case because surface asperities of the pulverized natural mineral are smoothed by surface-treating the pulverized natural mineral with the organic high polymer. Accordingly, cohesion of particles is reduced allowing the flame retardant to be dispersed well in the flame-retardant composition.

In addition, the discharge amount of the flame-retardant composition including the flame retardant and the organic high polymer from the kneader can be increased, thereby improving the productivity of the flame-retardant composition. This appears to be the case because the pulverized natural mineral is surface-treated with the organic high polymer, and thus the flame retardant is mixed well with the organic high polymer. Another reason may be that the organic high polymer is resistant to thermal decomposition compared with a conventional surface treatment agent such as fatty acid, and thus generation of volatile gas from the moisture in the natural mineral and the organic high polymer for example is reduced in the step of heating and kneading the flame retardant and the organic high polymer, which facilitates the feeding of the material into the kneader.

If the amount of surface treatment using the organic high polymer is within a range of 0.1 to 10 mass %, the effects described above are further improved.

If the organic high polymer includes one or a plurality of materials selected from the group consisting of polyolefin, a styrene type thermoplastic elastomer, and an olefin type thermoplastic elastomer, the organic high polymer has an excellent affinity for the organic high polymer such as polyolefin used for a wire covering material for example, and thus the flame retardant is dispersed well in the flame-retardant composition when added to the organic high polymer. Accordingly, the cold resistance of the flame-retardant composition is further improved.

If the polyolefin is polypropylene and/or polyethylene, the styrene type thermoplastic elastomer is a styrene-ethylene-butylene-styrene block copolymer and/or a styrene-ethylene-propylene-styrene block copolymer, and the olefin type thermoplastic elastomer is metallocene polyethylene, the effects described above are further improved.

The flame-retardant composition according to the preferred embodiment of the present invention includes the flame retardant described above and the organic high polymer, and is thus excellent in cold resistance and productivity.

If the organic high polymer of the flame retardant and the organic high polymer of the flame-retardant composition are of the same kind, compatibility is improved, thereby improving the affinity between the flame retardant and the organic high polymer in the flame-retardant composition.

If the flame-retardant composition includes 30 to 250 parts by mass of the flame retardant with respect to 100 parts by mass of the organic high polymer, the flame retardancy and the cold resistance are improved.

Because the insulated wire according to the preferred embodiment of the present invention and the wiring harness including the insulated wire include a conductor and the flame-retardant composition described above which covers the conductor, the insulated covering material is less prone to degradation, and thus the high reliability can be secured for a long time.

BEST MODE FOR CARRYING OUT THE INVENTION

Detailed descriptions of preferred embodiments of the present invention will now be provided.

A flame retardant according to a preferred embodiment of the present invention includes a pulverized natural mineral which is mainly composed of magnesium hydroxide.

Natural brucite for example may be used as the natural mineral. Either of a wet pulverizing method or a dry pulverizing method may be used to pulverize the natural mineral. The flame retardant according to the present preferred embodiment is prepared by pulverizing the natural mineral, and thus the manufacturing cost is lower than that of a flame retardant prepared by synthesizing magnesium hydroxide from the seawater for example. The initial moisture content of the pulverized natural mineral is preferably 1 mass % or less.

The average particle size of the pulverized natural mineral is preferably within a range of 0.1 to 20 μm. If the average particle size is less than 0.1 μm, secondary cohesion of particles tends to occur which decreases the mechanical property of a flame-retardant composition including the flame retardant and an organic high polymer. If the average particle size is more than 20 μm and the flame retardant is used for a wire coating material for example, the appearance of the coating material tends to be unfavorable. More preferably, the average particle size is within a range of 0.2 to 10 μm. If the average particle size is within the range of 0.2 to 10 μm, cohesion of particles during kneading can be reduced, the brittle temperature is lowered, and the cold resistance is improved.

The pulverized natural mineral is surface-treated with an organic high polymer. The amount of surface treatment using the organic high polymer is defined by the mass percentage (mass %) of the organic high polymer used as a surface treatment agent with respect to the mass of the flame retardant.

The amount of surface treatment is preferably within a range of 0.1 to 10 mass %. More preferably, it is within a range of 0.5 to 5 mass %. If the amount of surface treatment is less than 0.1 mass %, the cold resistance and the productivity of the flame-retardant composition prepared by adding the flame retardant to an organic high polymer tend to decrease. If the amount of surface treatment is more than 10 mass %, the cost of the flame retardant increases.

Although the molecular weight of the organic high polymer used in the surface treatment is not particularly limited, it is preferably to be relatively low. If the molecular weight and the melt viscosity are high, it is difficult for the organic high polymer to conform to the pulverized natural mineral when the surface treatment is applied. More specifically, the molecular weight is preferably within a range of 100 to 100,000, such that the organic high polymer is easy to melt into watery form when heated to about 100° C. and thus conform to the pulverized natural mineral.

As the organic high polymer, materials such as polyolefin, a styrene type thermoplastic elastomer, and an olefin type thermoplastic elastomer may be used. These materials may be used either singly or in combination. In addition, the above materials can be used together with other materials.

The above polyolefin may be a homopolymer or copolymer of α olefins such as ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene, or mixtures thereof. In addition, the copolymer of ethylene and vinylester may be used as the polyolefin, and the vinylester monomer used for the vinylester copolymer may be vinyl propionate, vinyl acetate, vinyl caproate, vinyl caprylate, vinyl laurate, vinyl stearate, and vinyl trifluoroacetate, and one or a plurality of above esters may be used. Further, a copolymer of ethylene and $\alpha,\beta$-unsaturated carboxylic acid alkyl ester may be used as the polyolefin. The $\alpha,\beta$-unsaturated carboxylic acid alkyl ester monomer may be methyl acrylate, methyl methacrylate, ethyl acrylate, and ethyl methacrylate, and one or a plurality of above $\alpha,\beta$-unsaturated carboxylic acid alkyl esters may be used. Polyethylene, polypropylene, and ethylene-propylene copolymer are particularly preferred. The ethylene-propylene copolymer may be either of a random copolymer and a block copolymer.

Examples of the styrene type thermoplastic elastomer include a styrene-ethylene-butylene-styrene block copolymer (SEBS), a styrene-ethylene-propylene-styrene block copolymer (SEPS), a styrene-ethylene-block copolymer (SEP), a styrene-ethylene-ethylene-propylene-styrene block copolymer (SEEPS), and a mixture of above copolymers.

Examples of the olefin type thermoplastic elastomer include metallocene polyethylene. The metallocene polyethylene refers to an ethylene homopolymer prepared using metallocene catalyst, or a copolymer of ethylene and a olefin whose carbon number is about 4 to 10. The metallocene catalyst includes a catalytic component in which a ligand having at least one cyclopentadienyl skeleton is coordinated to a transition metal atom such as titanium and zirconium, and is usually used together with an organic aluminium-oxy compound.

Examples of α olefin which copolymerizes with ethylene include ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene, and one or a plurality of above α olefins may be used.

The density of metallocene polyethylene may vary depending on the α olefin content in the copolymer. The density of metallocene polyethylene is preferably within a range of 0.7 to 1.0 g/cm$^3$. More preferably, the density is within a range of 0.8 to 0.9 g/cm$^3$.

The organic high polymer used in the surface treatment may be modified by acid. As the acid, unsaturated carboxylic acid and a derivative thereof may be preferably used. Examples of the unsaturated carboxylic acid include maleic acid and fumaric acid. Examples of the derivative thereof include maleic anhydride, monoester maleate, and diester maleate, with maleic acid and maleic anhydride being particularly preferred. The above materials may be used either in singly or in combination. Modifying the organic high polymer by acid makes it easier for the organic high polymer to conform to the inorganic pulverized natural mineral. Accordingly, the adhesiveness at the interface between the organic high polymer and the magnesium hydroxide is improved.

To apply acid to the organic high polymer used in the surface treatment, a method such as a grafting method and a direct (copolymerization) method may be used. The amount of acid modification is preferably within a range of 0.1 to 20 mass % with respect to the organic high polymer. A range of 0.2 to 10 mass % is more preferable, and a range of 0.2 to 5 mass % is yet more preferable. A smaller amount of acid modification tends to hinder improvement in the affinity for the pulverized natural mineral, and a larger amount of acid modification may cause self polymerization and thus hinder improvement in the affinity for the pulverized natural mineral.

The surface treatment of the pulverized natural mineral may be performed by agitating and mixing the pulverized natural mineral and the organic high polymer which is melted. The organic high polymer may be melted by heating, or it may be melted by the heat liberated when the natural mineral is pulverized. In addition, the organic high polymer may be used in the state of being melted in a solvent, or it may be used solventless.

Examples of a method of agitating and mixing include a method in which the solid or melted organic high polymer is added to the pulverized natural mineral which is being agitated in an agitator such as a mixer so that they are agitated and mixed, a method in which the pulverized natural mineral is added to the solid or melted organic high polymer which is being agitated in an agitator such as a mixer so that they are agitated and mixed, and a method in which the solid or melted organic high polymer is added to the pulverized natural mineral which is pulverized in a pulverizer and then they are agitated and mixed.

The surface of the pulverized natural mineral is partly or entirely covered with the organic high polymer by applying surface treatment. As for the pulverized natural mineral which is partly covered with the organic high polymer, it is sufficient if the pulverized natural mineral is covered to the extent that the flame retardant and the organic high polymer are sufficiently mixed and volatilization of the moisture in the magnesium hydroxide is reduced.

The organic high polymer covering the pulverized natural mineral may be provided in a single layer or in a plurality of layers. A single layer is more preferable because the surface treatment process can be simplified. If a plurality of layers of the organic high polymer are provided, all the layers may be of the same organic high polymer, or each layer may be different.

If a plurality of layers of the organic high polymer are provided, the innermost layer is not particularly limited, but an organic high polymer modified by acid is preferable because it has polar radical and a high affinity for the pulverized natural mineral which is inorganic. Organic high polymers having polar functional group such as polyamide, polyimide, polyamide-imide, urethane resin, polyester-imide are also preferably used as the innermost layer. The outermost layer is not particularly limited.

Surface treatment using a material other than an organic high polymer such as an organic material which is not a high polymer and an inorganic material may be applied to the pulverized natural mineral if it is applied under the surface treatment layer of the organic high polymer described above.

Next, a description of a flame-retardant composition according to a preferred embodiment of the present invention is provided.

The flame-retardant composition according to the present preferred embodiment includes the flame retardant described above and an organic high polymer. The flame-retardant composition preferably includes 30 to 250 parts by mass of the flame retardant described above with respect to 100 parts by mass of the organic high polymer. Including 50 to 200 parts by mass is more preferable, and 60 to 180 parts by mass is yet more preferable. The flame retardant of less than 30 parts by mass may decrease the flame retardancy and the flame retardant of more than 250 parts by mass may not bring sufficient mechanical property.

Polyolefin and a styrene type copolymer are preferably used as the organic high polymer, examples being polyethylene, polypropylene, ethylene-propylene rubber, and styrene-ethylene-butylene-styrene block copolymer. The organic high polymer in the flame retardant described above and the organic high polymer in the flame-retardant composition are preferably of the same kind so that the organic high polymer in the flame-retardant composition has an excellent affinity for the flame retardant.

The organic high polymer may be modified by acid. As the acid, unsaturated carboxylic acid and a derivative thereof may be preferably used. Examples of the unsaturated carboxylic acid include maleic acid and fumaric acid. Examples of the derivative thereof include maleic anhydride, monoester maleate, diester maleate. Maleic acid and maleic anhydride are particularly preferred. The above materials may be used either singly or in combination.

To apply acid to the organic high polymer, a method such as a grafting method and a direct (copolymerization) method may be used. The amount of acid modification is preferably in a range of 0.1 to 20 mass % with respect to the organic high polymer. A range of 0.2 to 10 mass % is more preferable, and a range of 0.2 to 5 mass % is yet more preferable. An amount of acid modification of less than 0.1 mass % may decrease the wear resistance, and an amount of acid modification of more than 20 mass % may degrade the moldability.

The flame-retardant composition according to the present preferred embodiment, if needed, may include other additives, provided that the properties of the flame-retardant composition are not impaired. The additives are not particularly limited, and a commonly-used filler for a wire covering material, a pigment, an oxidation inhibitor, and an age inhibitor may be used, for example.

A method for manufacturing the flame-retardant composition according to a preferred embodiment of the present invention includes a step of kneading the flame retardant described above and an organic high polymer. Other steps are not particularly limited, and general steps may be performed.

The step of kneading the flame retardant and the organic high polymer can be performed by using a commonly-used kneader such as a Banbury mixer, a pressure kneader, a kneading extruder, a twin-screw extruder, and a roll.

In the step of kneading, the organic high polymer may be firstly placed in the kneader and the flame retardant is added to the organic high polymer being agitated, or the flame retardant may be firstly placed in the kneader and the organic high polymer is added to the flame retardant being agitated. Alternatively, they may be dry blended preferably in a tumbler before kneading and then moved to the kneader to be kneaded.

The temperature at the kneading is preferably such a temperature that the viscosity of the organic high polymer is made low enough to facilitate dispersion of the flame retardant in the organic high polymer. To be more specific, the temperature at the kneading is preferably within a range of 100 to 300° C. If heat is generated from the organic high polymer sheared during the kneading, the temperature is adjusted to an appropriate temperature considering the temperature rise due to the heat.

After the kneading, the flame-retardant composition is removed from the kneader. At this time, the flame-retardant composition is preferably pelletized using a pelletizing machine.

As described above, the flame retardant according to the present preferred embodiment is surface-treated with the organic high polymer, and thus is mixed well at the kneading using the kneader, thereby facilitating a temperature rise at the kneading. In addition, clogging of the mesh of the kneader is reduced, and thus rise in the internal pressure is reduced.

Next, descriptions of an insulated wire and a wiring harness according to preferred embodiments of the present invention are provided.

The insulated wire according to the present preferred embodiment includes an insulated covering material prepared using the flame-retardant composition described above. In the insulated wire, the insulated covering material may directly cover a conductor, or other intermediate material such as a shielded conductor or other insulator may be interposed therebetween.

The characteristics of the conductor such as the size and the material are not particularly limited and may vary depending on the intended use. The thickness of the insulated covering material is also not particularly limited and may be determined considering factors such as the size of the conductor.

The insulated wire described above may be prepared by extrusion-covering the conductor using a commonly-used extrusion molding machine with the flame-retardant composition according to the preferred embodiment described above which is kneaded using a commonly-used kneader such as a Banbury mixer, a pressure kneader and a roll.

The wiring harness according to the present preferred embodiment includes the insulated wires described above. The wiring harness may be configured as a wire bundle composed of the insulated wires described above only, or it may be configured as a wire bundle including an insulated wire covered with other organic high polymer composition such as a vinyl chloride insulated wire and other insulated wire which does not include a halogen element. The wire bundle is preferably covered with a wiring-harness protective material for example. The number of wires is not particularly limited and may be arbitrarily determined.

The wiring-harness protective material covers the wire bundle, in which a plurality of insulated wires are bundled, to protect the wire bundle from the external environment for example. Although the base material of the wiring-harness protective material is not particularly limited, a polyolefin resin composition such as polyethylene and polypropylene is preferable. It is preferable that a flame retardant is appropriately added to the resin composition.

As the wiring-harness protective material, one having a tape-shaped base material at least one side of which an adhesive is applied on, or one having a base material which is tube-shaped or sheet-shaped for example may be selected according to the intended use.

EXAMPLE

A description of the present invention will now be given specifically with reference to Examples, however, the present invention is not limited hereto.

(Test Material, Manufacturer, and Other Information)

Test materials used in Examples and Comparative Examples are given along with manufacturers, trade names, and other information.

(A) Organic High Polymer
Polypropylene [manuf.: Sumitomo Chemical Co., Ltd., trade name: "AH585A"]
(B) Magnesium Hydroxide
Manuf.: FIMATEC LTD., trade name: "Junmag"]
(C) Surface Treatment Agent
(C-1) Polyolefin
Polypropylene [manuf.: Sanyo Chemical Industries Ltd., trade name: "SANWAX LEL800"]
Polyethylene [manuf.: Sanyo Chemical Industries Ltd., trade name: "VISCOL 330P"]
(C-2) Styrene Type Thermoplastic Elastomer
Styrene-ethylene-butylene-styrene block copolymer (SEBS) [manuf.: KURARAY CO., LTD., trade name: "SEPTON 8104"]
Maleic-anhydride modified styrene-ethylene-butylene -styrene block copolymer (MAH-SEBS) [manuf.: Asahi Kasei Corporation, trade name: "Tuftec 1913"]
Styrene-ethylene-propylene-styrene block copolymer (SEPS) [manuf.: KURARAY CO., LTD., trade name: "SEPTON 2002"]
(C-3) Ethylene Type Thermoplastic Elastomer
Metallocene polyethylene [manuf.: Sumitomo Chemical Co., Ltd., trade name: "Sumikathen E"]
(C-4) Stearic Acid [Manuf.: NOF CORPORATION, Trade Name: "Stearic Acid"]
(C-5) Zinc Stearate [Manuf.: NOF CORPORATION, Trade Name: "Zinc Stearate"]
(C-6) Methacrylic Silane [Manuf.: CHISSO CORPORATION, Trade Name "S710"]
(D) Oxidation Inhibitor
Manuf.: Ciba, trade name: "Irganoxs 1010"
(Preparation of Flame Retardant)

When each magnesium hydroxide was being agitated in a super mixer at a temperature of 200° C., each surface treatment agent shown in Table 1 was gradually poured in the mixer over about 5 minutes. After a predetermined amount of each surface treatment agent was poured, they were agitated for about another 20 minutes. Accordingly, flame retardants according to Examples and Comparative Examples were obtained.

(Preparation of Flame-retardant Composition and Insulated Wire)

Firstly, ingredients shown in Table 1 were kneaded at a mixing temperature of 200° C. using a twin-screw kneader and pelletized using a pelletizing machine. Accordingly, flame-retardant compositions according to Examples and flame-retardant compositions according to Comparative Examples were obtained. Then, by extrusion-covering conductors (cross sectional area: 0.5 mm 2), which are soft-copper strands prepared by bunching seven soft copper wires, with the obtained compositions to have a thickness of 0.2 mm using an extruder, insulated wires according to Examples and insulated wires according to Comparative Examples were prepared.

[Test Procedure]

The discharge amounts (kg/h) of the respective compositions prepared were evaluated. In addition, the respective insulated wires were subjected to a cold-resistance test.

(Cold-resistance Test)

The cold-resistance test was performed based on JIS C3005. To be more specific, the prepared insulated wires were cut into test specimens 38 mm long. The test specimens were set in a test machine and were hit with a striking implement while being cooled, and the temperature at the time when all of the five test specimens broke was determined as the cold-resistance temperature. Test specimens whose cold-resistance was −20° C. or less were evaluated as satisfactory.

Table 1 shows ingredient constitution and assessment results of the compositions.

In addition, it is found that the insulated wires according to Comparative Examples are inferior in cold resistance. This appears to be the case because magnesium hydroxide particles cohered, thereby decreasing dispersibility.

Contrarily, with Examples, it is found that the discharge amounts of the flame-retardant compositions are large and the productivity thereof is excellent. In addition, it is found that the insulated wires according to Examples are excellent in cold resistance.

While preferred embodiments of the present invention have been described above, it is to be understood that variations and modifications will be apparent to those skilled in the art without departing the scope and spirit of the present invention.

The invention claimed is:

1. A flame retardant composition comprising:
an organic high polymer, and
a flame retardant which includes:
  a pulverized natural mineral which is mainly composed of magnesium hydroxide; wherein
the pulverized natural mineral is surface-treated with a solid organic high polymer,
the solid organic high polymer includes polyethylene, polypropylene, and metallocene polyethylene,
the solid organic high polymer does not include ethylene-propylene copolymer and ethylene-propylene terpolymer, and
the solid organic high polymer of the flame retardant and the organic high polymer of the flame-retardant composition are of a same kind.

TABLE 1

| | | Example | | | | | | | | | | | Comparative Example | | |
|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 |
| Composition | Organic high polymer | | | | | | | | | | | | | | |
| | Polypropylene | 100 | 100 | 100 | 100 | 100 | 100 | 100 | 100 | 100 | 100 | 100 | 100 | 100 | 100 |
| | Flame retardant | | | | | | | | | | | | | | |
| | Surface-treated with 0.1% of PP | 100 | | | | | | | | | | | | | |
| | Surface-treated with 10% of PP | | 100 | | | | | | | | | | | | |
| | Surface-treated with 0.1% of PE | | | 100 | | | | | | | | | | | |
| | Surface-treated with 10% of PE | | | | 100 | | | | | | | | | | |
| | Surface-treated with 2% of SEBS | | | | | 100 | | | | | | | | | |
| | Surface-treated with 2% of MAH-SEBS | | | | | | 100 | 100 | 100 | 100 | | | | | |
| | Surface-treated with 2% of SEPS | | | | | | | | | | 100 | | | | |
| | Surface-treated with 2% of Metallocene PE | | | | | | | | | | | 100 | | | |
| | Surface-treated with 2% of Stearic acid | | | | | | | | | | | | 100 | | |
| | Surface-treated with 2% of Zinc stearate | | | | | | | | | | | | | 100 | |
| | Surface-treated with 6% of Methacrylic silane | | | | | | | | | | | | | | 100 |
| | Antioxidant | 1 | 1 | 1 | 1 | 1 | 1 | 1 | 1 | 1 | 1 | 1 | 1 | 1 | 1 |
| | Average particle size of flame retardant (μm) | 2.5 | 1 | 1 | 0.5 | 1 | 1.5 | 2 | 2.5 | 3 | 3 | 4 | 1.5 | 2 | 3 |
| Evaluation | Cold-resistance temperature (° C.) | −25 | −30 | −25 | −30 | −30 | −38 | −38 | −38 | −38 | −30 | −30 | −10 | −10 | −15 |
| | Discharge amount (kg/h) | 500 | 600 | 500 | 600 | 700 | 700 | 600 | 500 | 600 | 700 | 600 | 200 | 200 | 200 |

With Comparative Examples, the ingredients were not sufficiently fed to the twin-screw kneader, such that the discharge amounts of the flame-retardant compositions were low. This appears to be the case because volatile gas generated in the kneader flowed backward and prevented the feeding of the ingredient which was subsequently poured.

2. The flame retardant composition according to claim 1, wherein an amount of surface treatment using the solid organic high polymer is within a range of 0.1 to 10 mass %.

3. The flame-retardant composition according to claim 1 comprising 30 to 250 parts by mass of the flame retardant with respect to 100 parts by mass of the organic high polymer.

4. An insulated wire comprising:
   a conductor; and
   the flame-retardant composition according to claim 1 which covers the conductor.

5. A wiring harness comprising the insulated wire according to claim 4.

6. A method for manufacturing the flame retardant composition of claim 1, the method comprising:
   a step of kneading the flame retardant and the organic high polymer.

7. The flame retardant composition according to claim 1, wherein the solid organic high polymer is melted or dissolved in a solvent at the time of surface treatment.

* * * * *